United States Patent
Pitts et al.

(10) Patent No.: US 9,977,122 B2
(45) Date of Patent: May 22, 2018

(54) MULTI-FUNCTION SHARED APERTURE ARRAY

(71) Applicant: The Boeing Company, Chicago, IL (US)

(72) Inventors: Marty Allen Pitts, Maple Valley, WA (US); Julio A. Navarro, Kent, WA (US); Lixin Cai, Revensdale, WA (US)

(73) Assignee: The Boeing Company, Chicago, IL (US)

( * ) Notice: Subject to any disclaimer, the term of this patent is extended or adjusted under 35 U.S.C. 154(b) by 222 days.

(21) Appl. No.: 14/671,479

(22) Filed: Mar. 27, 2015

(65) Prior Publication Data
US 2016/0282462 A1    Sep. 29, 2016

(51) Int. Cl.
*G01S 13/86* (2006.01)
*H01Q 21/30* (2006.01)
(Continued)

(52) U.S. Cl.
CPC .............. *G01S 13/86* (2013.01); *G01S 7/006* (2013.01); *G01S 7/03* (2013.01); *G01S 13/426* (2013.01);
(Continued)

(58) Field of Classification Search
CPC ........ G01S 13/86; G01S 7/006; G01S 13/426; G01S 7/03; G01S 2013/0272;
(Continued)

(56) References Cited

U.S. PATENT DOCUMENTS

| | | | | |
|---|---|---|---|---|
| 4,733,238 A | * | 3/1988 | Fiden | G01S 7/006 342/60 |
| 5,248,979 A | * | 9/1993 | Orme | G01S 13/90 342/352 |

(Continued)

OTHER PUBLICATIONS

The Boeing Company, European Patent Application No. 16161835.0, Extended European Search Report, dated Aug. 17, 2016.

*Primary Examiner* — Tashiana R Adams
*Assistant Examiner* — Helena H Seraydaryan
(74) *Attorney, Agent, or Firm* — Charles L. Moore; Moore & Van Allen PLLC

(57) ABSTRACT

A multi-function radio frequency (RF) system may include a shared phased array antenna subsystem for transmitting and receiving radar signals and communications signals. The system may also include an integrated electronics package configured for controlling operation of the shared phased array antenna subsystem. The integrated electronics package may include a modulator/demodulator subsystem. The modulator/demodulator subsystem may include a radar module that is selectively coupled to the shared phased array antenna subsystem for transmitting and receiving radar signals. The radar module is configured to transmit and receive radar signals through the shared phased array antenna subsystem. The modulator/demodulator subsystem may also include a communications module that is selectively coupled to the shared phased array antenna subsystem for transmitting and receiving communications signals. The communications module is configured to transmit and receive communications signals through the shared phased array antenna subsystem.

23 Claims, 10 Drawing Sheets

(51) Int. Cl.
*H01Q 3/30* (2006.01)
*H01Q 13/06* (2006.01)
*H01Q 21/00* (2006.01)
*H01Q 21/06* (2006.01)
*H01Q 21/24* (2006.01)
*G01S 7/00* (2006.01)
*G01S 7/03* (2006.01)
*G01S 13/42* (2006.01)
*H01Q 1/28* (2006.01)
*H01Q 5/55* (2015.01)
*G01S 13/02* (2006.01)

(52) U.S. Cl.
CPC ............... *H01Q 3/30* (2013.01); *H01Q 13/06* (2013.01); *H01Q 21/0006* (2013.01); *H01Q 21/064* (2013.01); *H01Q 21/24* (2013.01); *H01Q 21/30* (2013.01); *G01S 2013/0245* (2013.01); *G01S 2013/0272* (2013.01); *H01Q 1/28* (2013.01); *H01Q 5/55* (2015.01)

(58) Field of Classification Search
CPC .. G01S 2013/0245; H01Q 21/30; H01Q 3/30; H01Q 13/06; H01Q 21/0006; H01Q 21/064; H01Q 21/24; H01Q 5/55; H01Q 1/28
USPC .......................................................... 342/57
See application file for complete search history.

(56) References Cited

U.S. PATENT DOCUMENTS

| | | | | |
|---|---|---|---|---|
| 7,893,867 | B2 * | 2/2011 | Navarro | G01S 7/006 342/157 |
| 9,634,389 | B2 * | 4/2017 | Tseng | H01Q 3/385 |
| 2004/0012533 | A1 * | 1/2004 | Navarro | H01Q 21/0093 343/776 |
| 2004/0239553 | A1 * | 12/2004 | Kim | G01S 7/022 342/52 |
| 2007/0035439 | A1 * | 2/2007 | Michel | G01S 7/003 342/41 |
| 2008/0030404 | A1 * | 2/2008 | Irwin | H01Q 1/276 342/372 |
| 2009/0033556 | A1 * | 2/2009 | Stickley | G01S 13/003 342/374 |
| 2009/0102716 | A1 * | 4/2009 | Sego | G01S 7/003 342/377 |
| 2009/0135085 | A1 * | 5/2009 | Raby | H01Q 3/26 343/906 |
| 2010/0060517 | A1 * | 3/2010 | Nichols | H01Q 21/0025 342/357.29 |
| 2010/0099370 | A1 * | 4/2010 | Nichols | H01Q 1/3275 455/129 |
| 2010/0194640 | A1 * | 8/2010 | Navarro | G01S 7/006 342/372 |
| 2011/0143678 | A1 * | 6/2011 | Saito | H01Q 1/2208 455/67.11 |

* cited by examiner

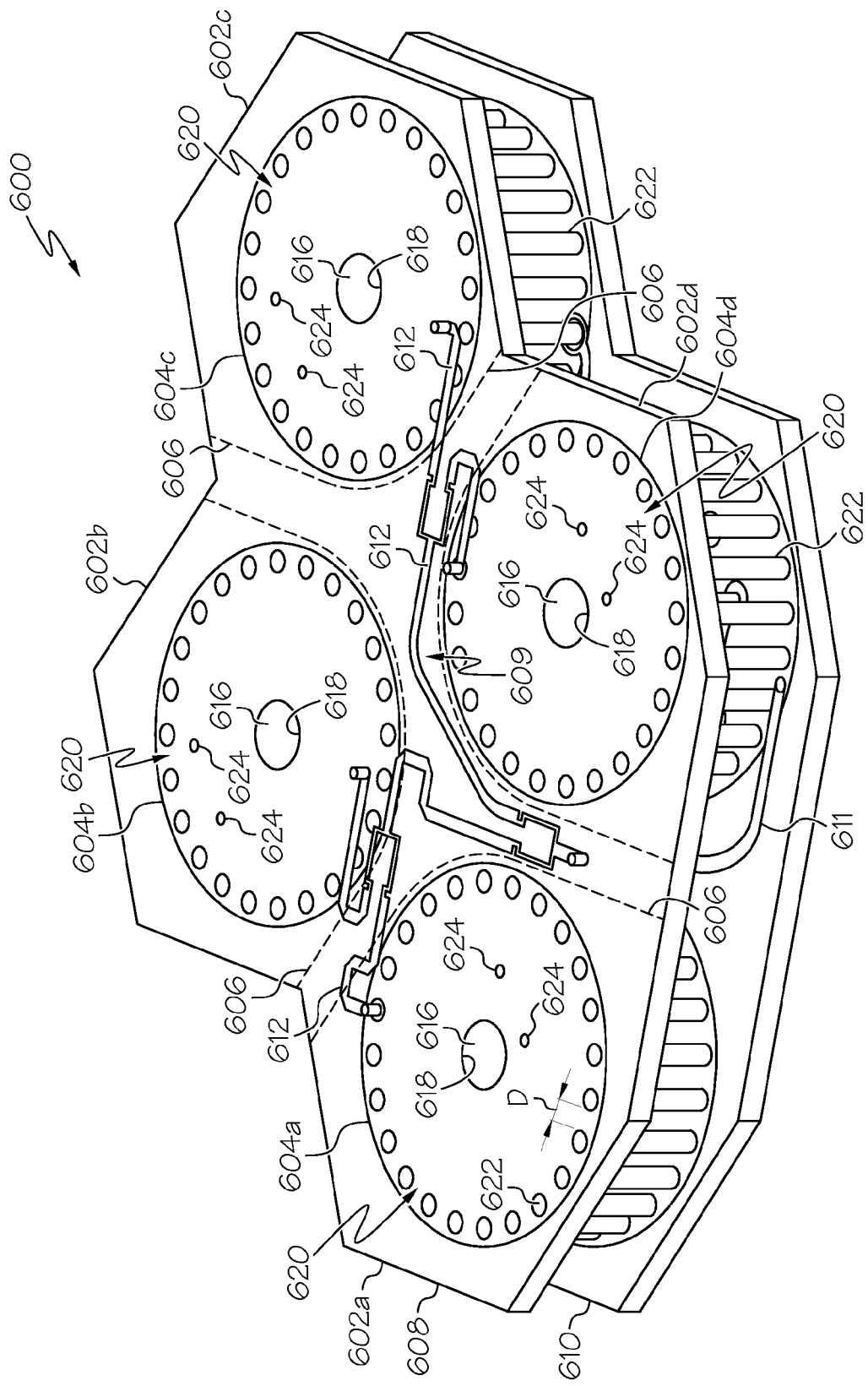

MULTI-FUNCTION SHARED APERTURE ARRAY

FIELD

The present disclosure relates to antenna arrays, radar systems and communications systems, and more particularly to a multi-function shared aperture array or shared antenna array.

BACKGROUND

Current radar and communications systems or subsystems are implemented as independent systems each with a separate aperture and electronics. Such solutions require added weight and larger surface areas for the separate apertures. In some applications, this may be acceptable. However, when such multi-functionality was desired on platforms that have smaller surface areas and weight restrictions, such as unmanned aerial vehicles (UAVs), having multiple separate functions and systems is not practical. Additionally, the separate systems also require longer times to offload sensor data, such as sensor data received and processed by the radar system and then offloaded or transmitted by the communications system to another location, such as from the UAV to a ground station. This reduces the ability to provide situational awareness closer to real-time. The separate independent systems also made less effective the use of networked UAVs for distributed sensing, processing and collaboration.

SUMMARY

In accordance with an embodiment, a multi-function radio frequency (RF) system may include a shared phased array antenna subsystem for transmitting and receiving radar signals and communications signals. The system may also include an integrated electronics package configured for controlling operation of the shared phased array antenna subsystem. The integrated electronics package may include a modulator/demodulator subsystem. The modulator/demodulator subsystem may include a radar module that is selectively coupled to the shared phased array antenna subsystem for transmitting and receiving radar signals. The radar module may be configured to transmit and receive radar signals through the shared phased array antenna subsystem. The modulator/demodulator subsystem may also include a communications module that is selectively coupled to the shared phased array antenna subsystem for transmitting and receiving communications signals. The communications module may be configured to transmit and receive communications signals through the shared phased array antenna subsystem.

In accordance with another embodiment and the pervious embodiment, a shared phased array antenna subsystem may include a plurality of antenna tiles disposed adjacent one another. Each antenna tile may include an active phased array aperture for transmitting and receiving radar signals and communications signals. The shared phased array antenna subsystem may also include an interstitial region between adjacent tiles. The shared phased array antenna subsystem may additionally include a distribution network for at least one of electrical power, RF communications and data to the plurality of tiles. The distribution network may reside within the interstitial region between adjacent tiles.

In accordance with a further embodiment, a method for transmitting and receiving radar signals and communications signals may include providing a shared phased array antenna subsystem configured for transmitting and receiving radar signals and communications signals. The method may also include integrating an electronics package configured for controlling operation of the shared phased array antenna subsystem. The integrated electronics package may include a radar module that is selectively coupled to the shared phased array antenna subsystem for transmitting and receiving radar signals. The radar module may be configured to transmit and receive radar signals through the shared phased array antenna subsystem. The integrated electronics package may also include a communications module that is selectively coupled to the shared phased array antenna subsystem for transmitting and receiving communications signals. The communications module may be configured to transmit and receive communications signals through the shared phased array antenna subsystem.

BRIEF DESCRIPTION OF THE SEVERAL VIEWS OF DRAWINGS

The following detailed description of embodiments refers to the accompanying drawings, which illustrate specific embodiments of the disclosure. Other embodiments having different structures and operations do not depart from the scope of the present disclosure.

FIG. 6A is a perspective view of an example of an MFSA shared active antenna or radiator array of an MFSA system in accordance with an embodiment.

DETAILED DESCRIPTION

Figure 1:
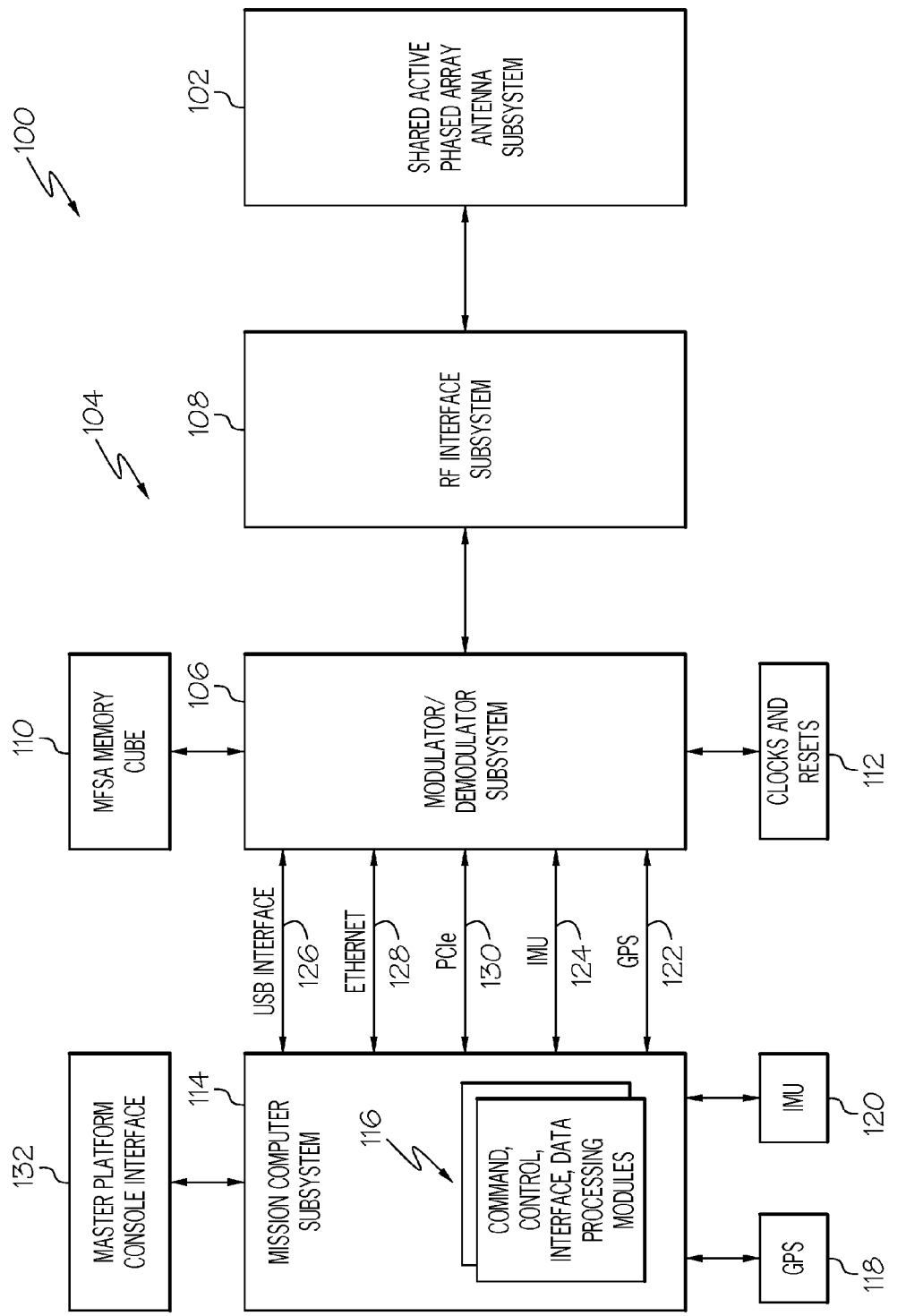
FIG. 1 is a block schematic diagram of an example of a multi-function shared aperture (MFSA) system in accordance with an embodiment.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Certain terminology is used herein for convenience only and is not to be taken as a limitation on the embodiments described. For example, words such as "proximal", "distal", "top", "bottom", "upper," "lower," "left," "right," "horizontal," "vertical," "upward," and "downward", etc., merely describe the configuration shown in the figures or relative positions used with reference to the orientation of the figures being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

FIG. 1 is a block schematic diagram of an example of a multi-function shared aperture (MFSA) system 100 in accordance with an embodiment. As described herein, the MFSA system 100 may be configured to transmit and receive radio frequency (RF) signals that may include radar signals or waveforms and communications signals or waveforms. Accordingly, the MFSA system 100 may also be referred to as a multi-function RF system. The MFSA system 100 may include a shared active phased array antenna subsystem 102 that may be configured to transmit and receive radar signals and communications signals. An example of a shared active phased array antenna subsystem that may be used for the shared active phased array antenna subsystem 102 will be described in more detail with reference to FIGS. 5 and 6. The system 100 may also include an integrated electronics package 104 that may be configured for controlling operation of the shared phased array antenna subsystem 102. The integrated electronics package 104 may include a modulator/demodulator subsystem 106. An example of a modulator/demodulator subsystem that may be used for the modulator/demodulator subsystem 106 will be described in more detail with reference to FIG. 3. The modulator/demodulator subsystem 106 may be coupled to the shared active phased array antenna subsystem 102 by an RF interface subsystem 108. An example of an RF interface subsystem that may be used for the RF interface subsystem 108 will be described in more detail with reference to FIG. 4.

An MFSA memory cube 110 may be associated with the modulator/demodulator subsystem 106 for storing various types of information or data. An example of an MFSA memory cube that may be used for the cube 110 will be described with reference to FIG. 3. Examples of the various types of information or data that may be stored by the memory cube 110 may include, but is not necessarily limited to, beam steering control information, surveillance information that may be collected by the system 100 before offloading to another system, communications network information or messages, or other information and data.

A clocks and resets unit 112 may also be associated with the modulator/demodulator subsystem 106. The clocks and reset unit 112 may provide input signals to the modulator/demodulator subsystem 106 for timing operation of the modulator/demodulator subsystem 106.

The system 100 or integrated electronics package 104 may also include a mission computer subsystem 114. The mission computer subsystem 114 may be configured for controlling operation of the other subsystems of the MFSA system 100 and may include a suite of command, control, interface and data processing modules 116 that may be configured to functionally integrate operation of the other subsystems and control operations of the other subsystems. An example of a mission computer subsystem that may be used for the mission computer subsystem 112 will be described in more detail with reference to FIG. 2.

The mission computer subsystem 114 may receive data from a global positioning system (GPS) unit 118 and an inertial measurement unit (IMU) 120. This GPS and IMU data may be transmitted from the mission computer subsystem 114 to the modulator/demodulator subsystem 106 by links 122 and 124. Examples of other communications links or buses between the mission computer subsystem 114 and the modulator/demodulator subsystem 106 may include, but is not necessarily limited to, a universal serial bus (USB) interface 126, an Ethernet bus 128 and a peripheral component interconnect express (PCIe) bus 130.

The system 100 may also include a master platform control interface 132. The master platform control interface 132 provides a user interface for controlling operation of the mission computer subsystem 114 and updating the mission computer subsystem 114.

The system 100 may be configured as described herein to provide a radar operating frequency range between about 15.7 gigahertz (GHz) and about 17.3 GHz and a communications operating frequency range between about 14.4 GHz and about 15.35 GHz.

Figure 2:
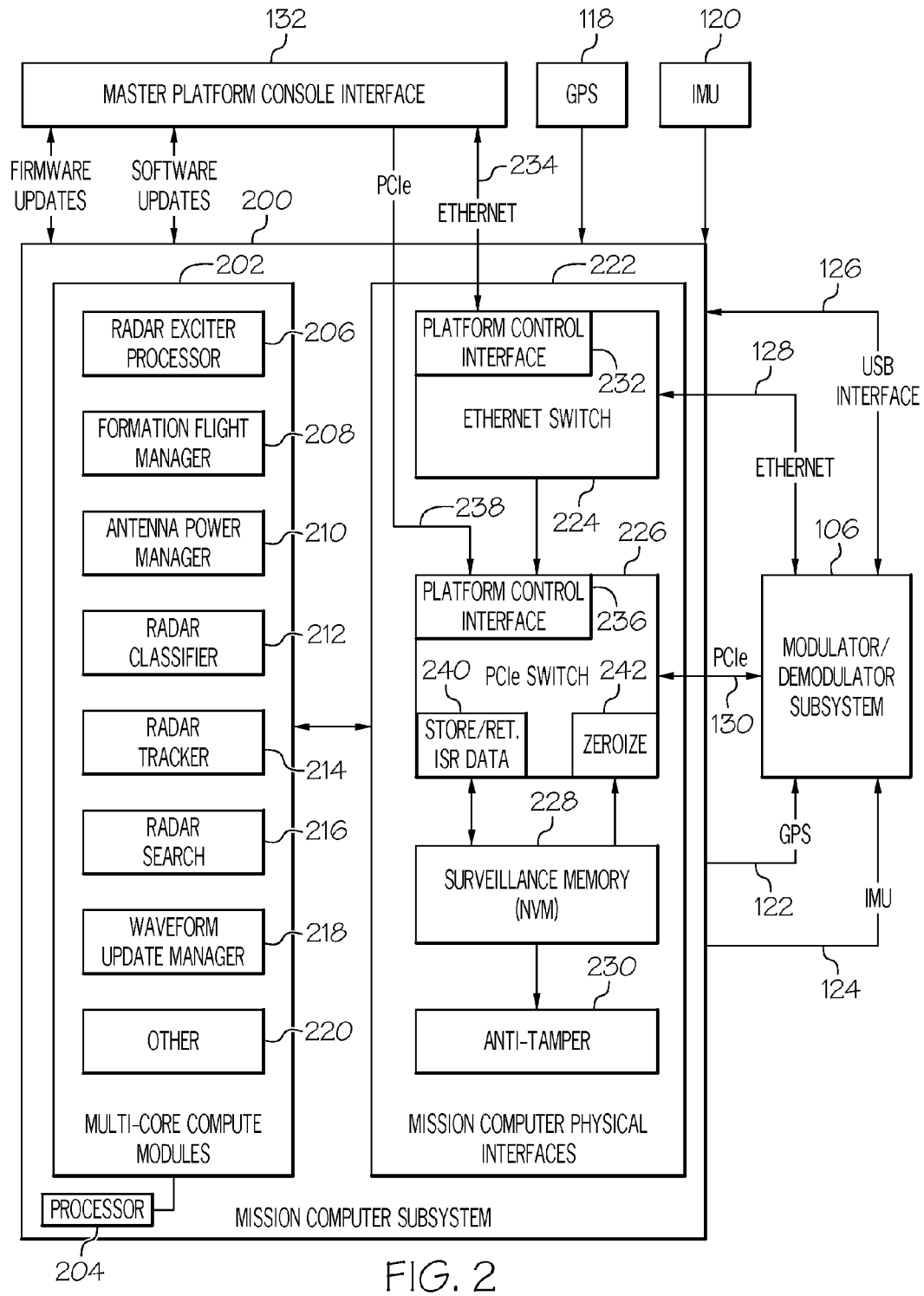
FIG. 2 is a block schematic diagram of an example of a mission computer subsystem of an MFSA system in accordance with an embodiment.

FIG. 2 is a block schematic diagram of an example of a mission computer subsystem 200 that may be part of the MFSA system 100 in FIG. 1 in accordance with an embodiment. The mission computer subsystem 200 may be used for the mission computer subsystem 114 in FIG. 1. The mission computer subsystem 200 may include a plurality of multi-core compute modules 202 that may be compiled and run on a processor 204 to perform various functions and operations as described below. Examples of the multi-core compute modules 202 may include but is not necessarily limited to, a radar exciter processor 206, a formation flight manager 208, and antenna power manager 210, a radar classifier module 212, a radar tracker module 214, a radar search module 216, a waveform update manager 218 or other modules 220. The radar exciter processor 206 may generate certain radar signals or waveforms that may be transmitted by the shared active phased array antenna subsystem 102 for performing surveillance or tracking of one or more targets or objects. The formation flight manager 208 may be configured to control the system 100 for operation is coordination or association with other MFSA systems or RF systems. The antenna power manager 210 may be configured to control an amount of power or gain of the antenna elements or radiator elements associated with the shared active aperture antenna subsystem 102. The radar classifier module 212 may be configured to identify different targets or objects based on a returned or scattered radar signal or waveform received by the shared active phased array antenna subsystem 102. The radar tracker module 214 and radar search module 216 may be configured to generate control signals for controlling scanning, directional control, beam forming and other characteristics of the radar signals, beams or waveforms generated by the system 100 and transmitted by the shared active phased array antenna subsystem 102. The waveform update manager 218 may manage different types of waveforms that may be generated by the system 100 and transmitted by the shared active phased array antenna subsystem 102.

The mission computer subsystem 200 may also include a plurality of mission computer physical interfaces 222. Examples of mission computer physical interfaces 222 may include, but is not necessarily limited to an Ethernet switch 224, a PCIe switch 226, a surveillance memory 228 and an anti-tamper interface 230. Surveillance memory 228 may be a non-volatile memory (NVM). The Ethernet switch 224 may include a platform payload interface 232 that is connected to the master platform console interface 132 by a first Ethernet bus 234. The Ethernet switch 224 may also be connected to the modulator/demodulator subsystem 106 by the second Ethernet bus 128. The Ethernet switch 224 may further be connected to the modulator/demodulator subsystem 106 by the USB interface bus 126.

The PCIe switch 226 may include a platform control interface 236. The platform control interface 236 may be connected to the Ethernet switch 224 for receiving signals from the Ethernet switch 224 and may also be connected to the master platform console interface 132 by a first PCIe bus 238. The PCIe switch 226 may be connected to the modulator/demodulator 106 by the second PCIe bus 130.

The PCIe switch 226 may also include a store and retrieve integrated surveillance radar (ISR) data interface 240 for storing and retrieving ISR data on the surveillance memory 228. The PCIe switch 226 may also include a zeroize interface 242 for receiving signals from the surveillance memory 228 for zeroing or resetting surveillance information memories in memory 228 which a security analysis team may deem proprietary.

The surveillance memory 228 may store surveillance information or data associated with targets. The anti-tamper interface 230 may be connected to the surveillance memory 228 to prevent tampering of the surveillance or data in the surveillance memory 228. The surveillance memory may be a non-volatile memory.

The mission computer physical interfaces 222 may receive information or data from the GPS 118 and IMU 120 and transmit the GPS and IMU data or information to the modulator/demodulator subsystem 106 via links 122 and 124, respectively, as previously described.

Figure 3:
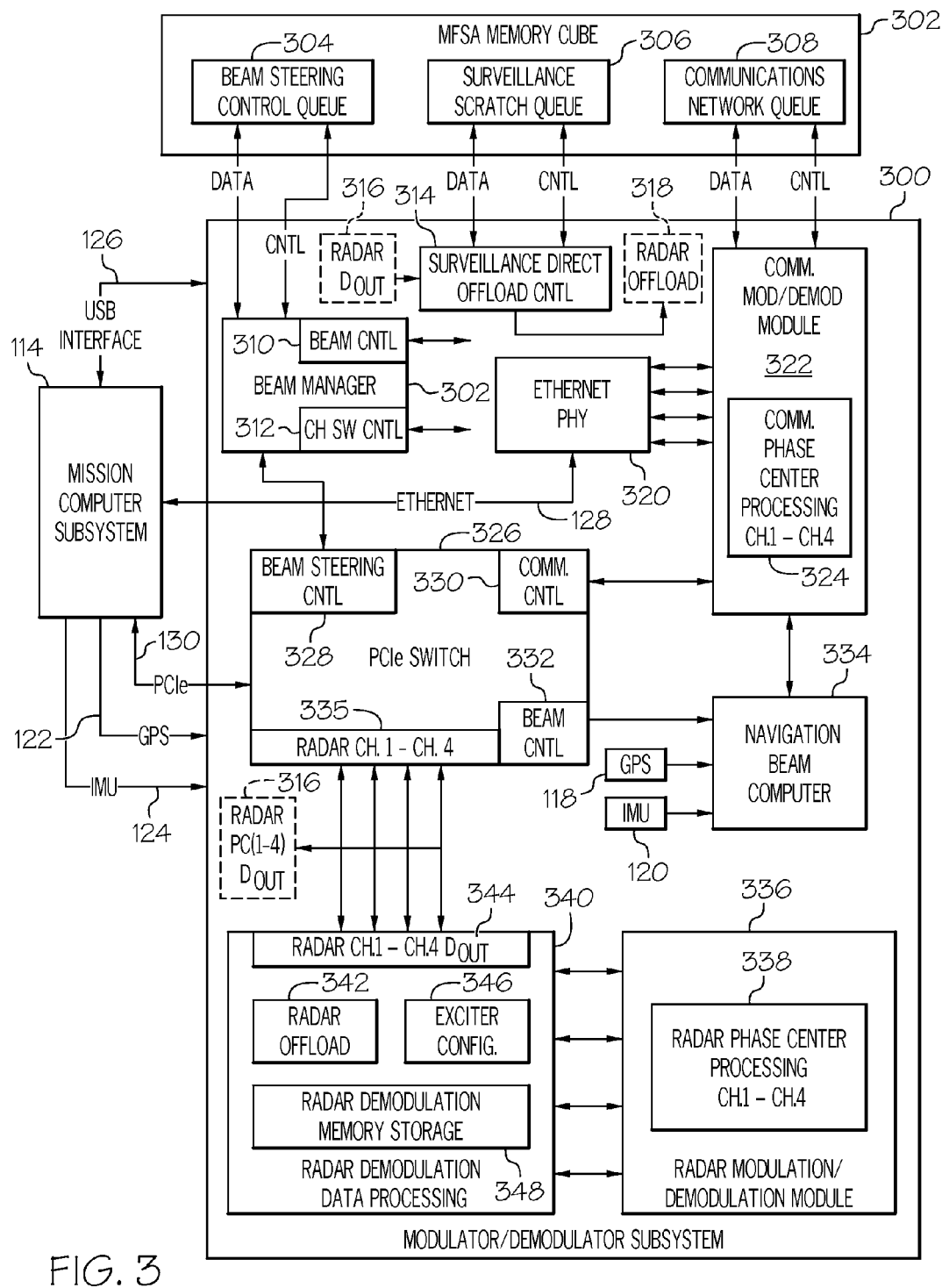
FIG. 3 is a block schematic diagram of an example ofa modulator/demodulator subsystem of an MFSA system in accordance with an embodiment.

FIG. 3 is a block schematic diagram of an example of a modulator/demodulator subsystem 300 and MFSA memory cube 302 that may be part of the MFSA system 100 in FIG. 1 in accordance with an embodiment. The modulator/demodulator 300 may be used for the modulator/demodulator subsystem 106 in FIG. 1, and the MFSA memory cube 302 may be used for the MFSA memory cube 110. The MFSA memory cube 302 may include a beam steering control queue 304, a surveillance scratch queue 306 and a communications network queue 308. The modulator/demodulator subsystem 300 may include a beam manager 302. The beam manager 302 may be configured to control characteristics of radar beams and communications beams transmitted or received by the shared active phased array antenna subsystem 102, such as beam width, beam angle, scanning, waveform characteristics, RF power and other characteristics. Additionally the modulator/demodulator subsystem 300 may host communication waveforms specific to diverse platform mission assignments on access denied RF environments including waveforms for 1) Low Probability of Intercept, Low Probability of Detect (LPI/LPD) leveraging spread spectrum technology; 2) High speed information offload leveraging high speed communication technology; 3) Anti-Jam technology when operating in an access denied air-to-air defense (A2AD) environment. The beam manager 302 may receive data and control information from the beam steering control queue 304 of the MFSA memory cube 302. The beam manager 302 may transmit and receive a beam control signal 310 including beam control information and a channel switch control signal 312 including channel control information from other components or subsystems of the system 100, such as RF interface subsystem 108 and shared active phased array antenna subsystem 102 for controlling operation of these other components or subsystems.

The modulator/demodulator subsystem 300 may also include a surveillance direct radar offload control component 314 that may receive radar data or information 316 received by the system 100 and may offload 318 the radar information or data to another system. The surveillance direct offload control component 314 may store and retrieve radar data and information 316 received by the system 100 in the surveillance scratch queue 306 of the MFSA memory cube 302. The radar data or information 316 received by the system 100 may be stored in the surveillance scratch queue 306 temporarily and then at a later, appropriate time may be offloaded 318 by the surveillance direct offload control component 314 to another system.

The modulator/demodulator subsystem 300 may also include an Ethernet PHY 320 or physical layer chip connected to the mission computer subsystem 114 via the Ethernet bus 128. The Ethernet PHY 320 may translate and transfer data and information received via the Ethernet bus 128 from the mission computer subsystem 114 to a communications modulation/demodulation module 322. The communications modulation/demodulation module 322 may be configured for modulating communications signals transmitted by the system 100 (FIG. 1) and for demodulating communications signals received by the system 100. For example, the modulation/demodulation module 322 may include a signal processing program or programs for communication phase center processing of four communications channels (Ch. 1-Ch. 4) 324. The communications modulation/demodulation module 322 may receive data and control signals from the communications network queue 308 and may store data and control information in the communications network queue 308.

The modulation/demodulation subsystem 300 may include a PCIe switch 326 for receiving and transmitting data, control signals and information from and to the mission computer subsystem 114 via the PCIe bus 130. The PCIe switch 326 may transmit beam steering control information 328 received from the mission computer subsystem 114 to the beam manager 302 and may receive any return data or information from the beam manager 302. The PCIe switch 326 may also transmit communications control data and information 330 from the mission computer subsystem 114 to the communications modulation/demodulation module 322 and may receive any return data or information. The PCIe switch 326 may also transmit beam control information 332 received from the mission computer subsystem 114 to a navigation beam computer 334 and may receive any return data or information. The navigation beam computer 334 may also receive GPS data 118 and IMU data 120. The PCIe switch 326 may also include ports 335 for transmitting and receiving radar data and information to and from the mission computer subsystem 114 via the PCIe bus 130.

The modulator/demodulator subsystem 300 may also include a radar modulation/demodulation module 336. The modulation/demodulation module 336 may be configured for modulating radar signals transmitted by the system 100 (FIG. 1) and for demodulating radar signals received by the system 100. For example, the modulation/demodulation module 336 may include a signal processing program or programs for radar phase center processing of four radar channels (Ch. 1-Ch. 4) 338.

The modulator/demodulator subsystem 300 may additionally include a radar demodulation data processing module 340. The radar demodulation data processing module is connected to the radar modulation/demodulation module 336 and may process radar signals or data received from the radar modulation/demodulation module 336. The radar demodulation data processing module 340 may include a radar offload component 342 for controlling offloading of radar information 344 received and processed by the system 100. The radar demodulation data processing module 340 may include ports 344 for radar channels 1-4 for transmitting radar data and information 316 to the surveillance direct offload control component 314 and to the PCIe switch 326. The ports 344 may also transmit and receive radar data and information from the ports 335 of the PCIe switch 326. The PCIe switch 326 may transmit and receive radar data and information to and from the radar demodulation data processing module 340 and the mission computer subsystem 114.

The radar demodulation data processing module 340 may further include an exciter configuration component 346 and a radar demodulation memory storage 348. The exciter configuration component 346 may generate a particular radar waveform or signal for generation by the system 100. The radar demodulation memory storage 348 may store radar data and information.

Figure 4:
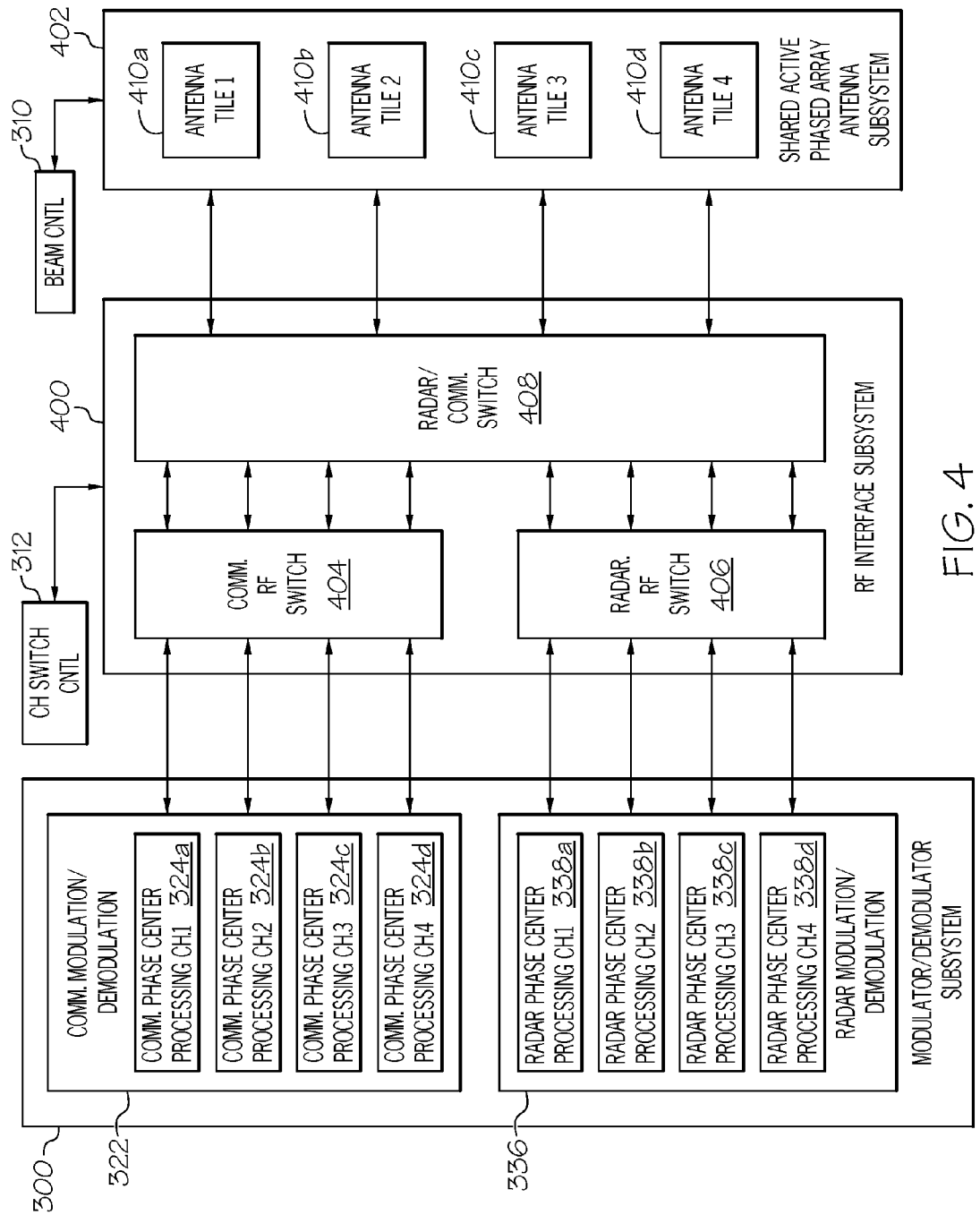
FIG. 4 is a block schematic diagram of an example of a radio frequency (RF) interface subsystem and multi-function shared phased array antenna subsystem of an MFSA system in accordance with an embodiment.

FIG. 4 is a block schematic diagram of an example of a radio frequency (RF) interface subsystem 400 and multi-function shared phased array antenna subsystem 402 that may be part of the MFSA system 100 of FIG. 1 in accordance with an embodiment. The RF interface subsystem 400 may be used for the RF interface subsystem 108 in FIG. 1 and the shared active phased array antenna subsystem 402 may be used for the shared phased array antenna subsystem 102. The RF interface subsystem 400 may include a communications RF switch 404 and a radar RF switch 406. The communications RF switch may transmit and receive communications signals from the communications modulation/demodulation module 322. Similar to that previously described, the communications modulation/demodulation module 322 may include communications phase center processing for four communications channels (communications channels 1-4) 324a-324d.

The RF radar switch 406 may transmit and receive radar signals from the radar modulation/demodulation module 336. Similar to that previously described, the radar modulation/demodulation module 336 may include radar phase center processing for four communications channels (radar channels 1-4) 338a-338d.

The RF interface subsystem 400 may also include a radar/communications switch 408 connected to the communications RF switch 404 and the radar RF switch 406. Outputs of the radar/communications switch 408 are connected to the shared active phased array antenna system 402.

The shared active phased array antenna subsystem 402 may include a plurality of antenna tiles 410a-410d. For example, the shared active phased array antenna subsystem 402 may include four antenna tiles 410a-410d. The shared phased array antenna subsystem 402 may include between about 16 and about 128 antenna elements. In accordance with one embodiment, the shared phase array antenna subsystem 402 includes 64 antenna elements. A block diagram of an example of a unit cell of an antenna tile of a shared active phased array antenna subsystem that may be used for the shared active phased array subsystem 102 or 402 will be described in more detail with reference to FIG. 5 and an example of an MFSA shared active antenna or radiator array or part of an array that may be used for the shared active phased array antenna subsystem 102 or 402 will be described with reference to FIGS. 6A and 6B.

The radar/communications switch 408 and the communications RF switch 404 and radar RF switch 406 may be operated or controlled in response to the channel switch control signal 312 from the beam manager 302 of the modulator/demodulator subsystem 300 (FIG. 3). Accordingly, a particular one of the communications phase center processing channels 324a-324d or radar phase center processing channels 338a-338d may be selectively connected to a particular antenna tile 410a-410d of the shared active phased array antenna subsystem 402 in response to the channel switch control signal 312. Particular characteristics of the beam generated by the shared active phased array antenna subsystem 402 may be determined based on the beam control signal 310 or signals from the beam manager 302.

Figure 5:
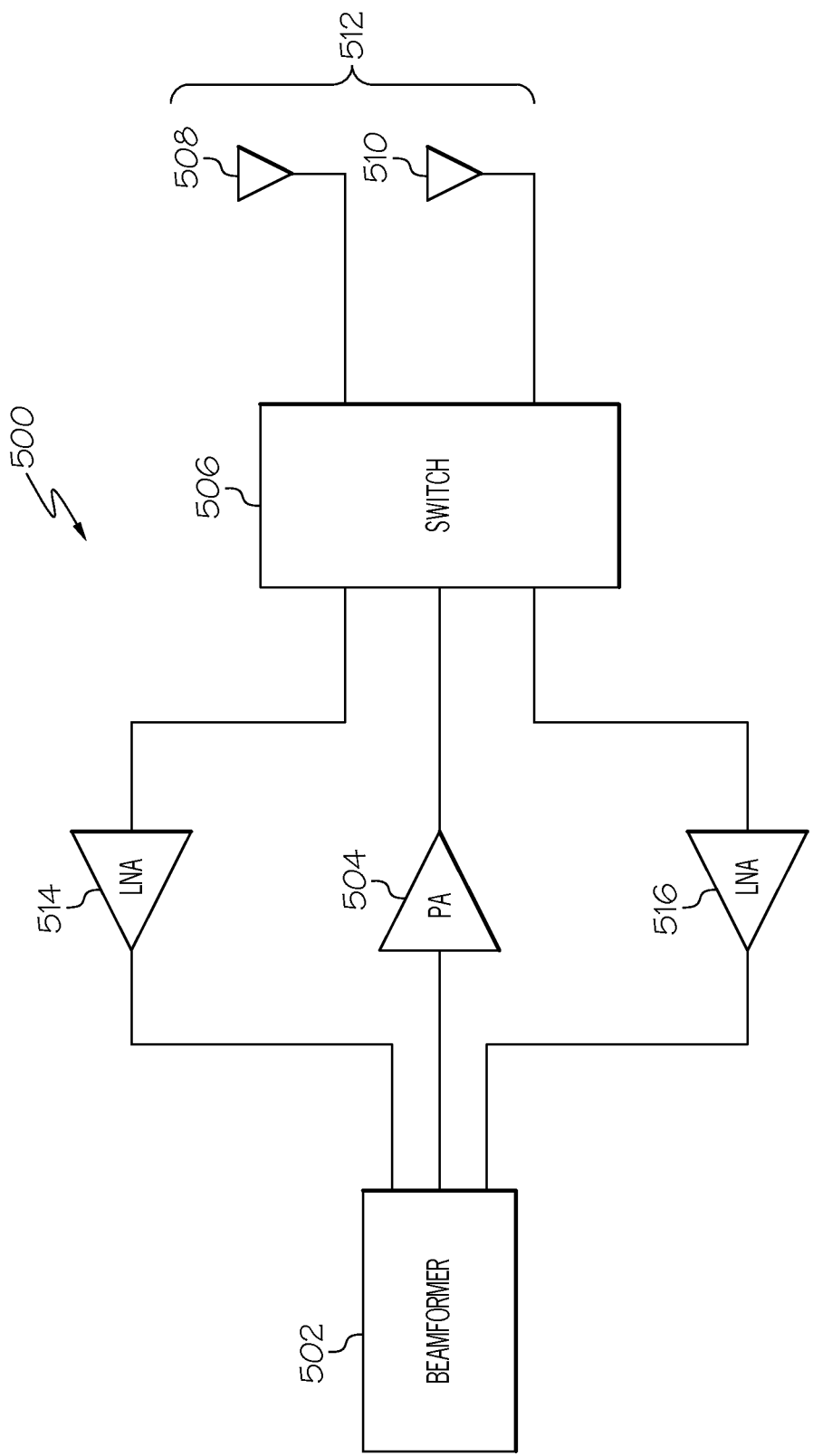
FIG. 5 is a block schematic diagram of an example of a unit cell of a shared active phase antenna array subsystem of an MFSA system in accordance with an embodiment.

FIG. 5 is a block schematic diagram of an example of a unit cell 500 of a shared active phase antenna array subsystem of an MFSA system in accordance with an embodiment. The unit cell 500 may be used for or may be part of one of the antenna tiles 410a-410d of the shared active phased array subsystem 402. The unit cell 500 may include a beamformer module 502. The beamformer module 502 may be configure to generate a communications beam or radar beam having particular characteristics, such as a certain beam width and shape or radiation pattern, etc. The output of the beamformer module 502 is connected to a power amplifier 504. The power amplifier may amplify the communications signal or radar signal. The power amplifier (PA) 504 is connected to an RF switch 506. The RF switch 506 may be operated to connect the communications signal or radar signal from the power amplifier to a first antenna element 508 or second antenna element 510. The first antenna element 508 and the second antenna element 510 may define a shared aperture 512 configured for transmitting and receiving radar signals and communications signals.

A radar signal or communications signal received by the shared aperture 512 may be connected to a first low noise amplifier (LNA) 514 or second low noise amplifier 516 depending upon the type of signal. An output of each low noise amplifier 514 and 516 is connected to the beamformer 502.

Figure 6B:
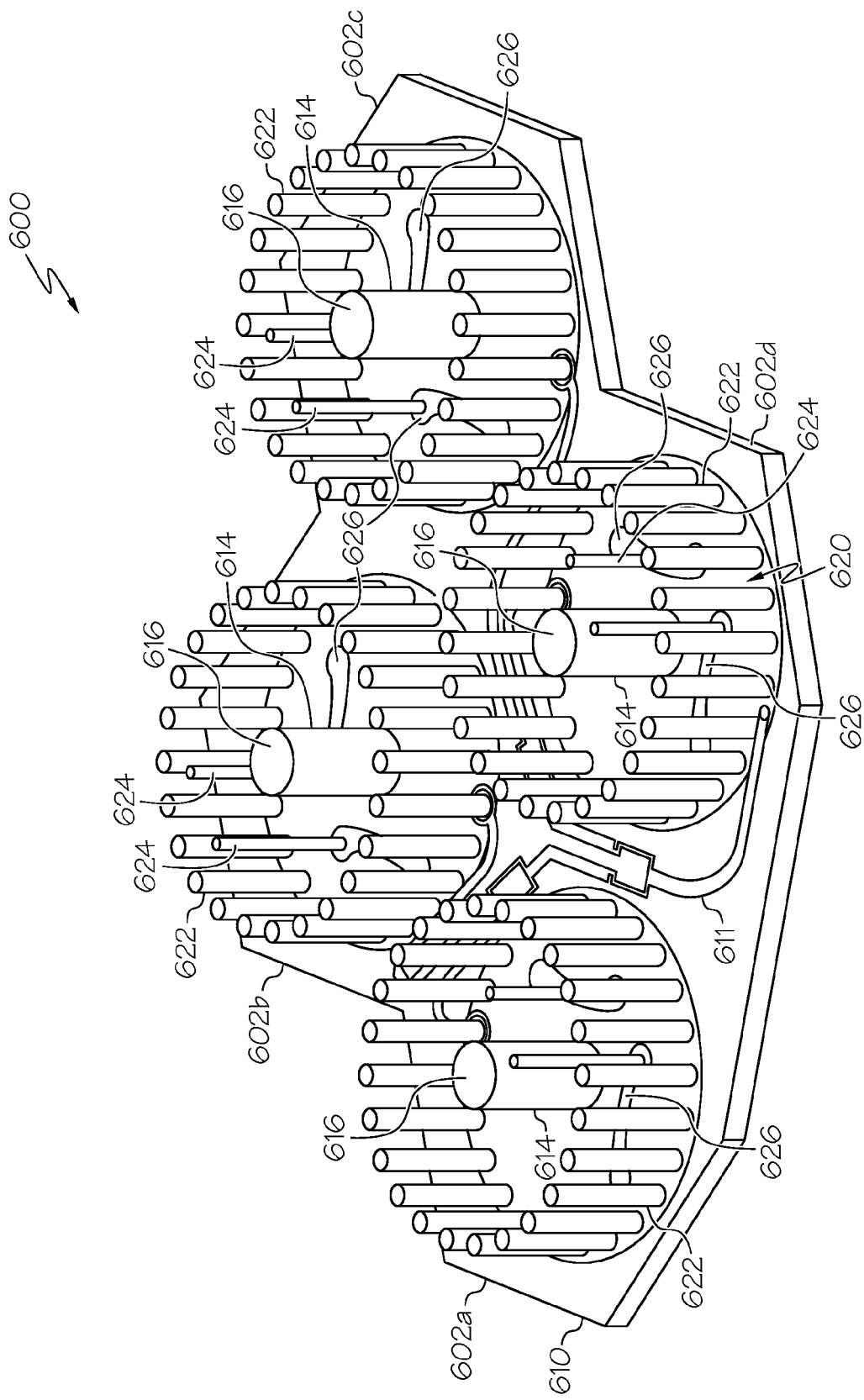
FIG. 6B is a perspective view of the exemplary MFSA shared active antenna or radiator array of FIG. 6A with the top circuit board removed.

FIG. 6A is a perspective view of an example of an MFSA shared active antenna or radiator array 600 of an MFSA system in accordance with an embodiment. FIG. 6B is a perspective view of the exemplary MFSA shared active antenna or radiator array of FIG. 6A with the top circuit board removed. The MFSA shared active antenna or radiator array 600 may be used for the shared active phased array antenna subsystem 102 in FIG. 1 or 402 in FIG. 4. In the example of FIG. 6, the MFSA shared active antenna or radiator array 600 includes four adjacent antenna tiles 602a-602d. The shared active phased array antenna subsystem 102 or 402 may include a multiplicity of shared active antenna or radiator arrays 600. The antenna tiles 602a-602d may also be referred to as antenna elements or radiator elements. The exemplary antenna tiles 602a-602d are shown in FIGS. 6A and 6B are shown to be hexagonal in shape, although other shapes may be used in other embodiments, such as square, rectangular or other shapes depending upon the environment where the MFSA shared active antenna array 600 may be used. The plurality of antenna tiles 602a-602d may be disposed or placed adjacent one another. Each antenna tile 602a-602d may include an active phased array aperture 604a-604d for transmitting and receiving radar signals and communications signals. An interstitial region 606 is provided between each adjacent tile 602a-602d. The interstitial regions 606 are depicted in FIG. 6 by dashed lines. A distribution network 609 for at least one of electrical power or RF power, RF signals, data or other information may reside within the interstitial region 606 between adjacent antenna tiles 602a-602d on an upper circuit board 608. In accordance with an embodiment a distribution network for each of electrical or RF power. RF signals, data and other information may be provided within the interstitial region 606 between adjacent antenna tiles 602a-602d.

The shared phased array antenna subsystem may include an upper circuit board 608 and a lower circuit board 610. The adjacent antenna tiles 602a-602d may be formed between an upper circuit board 608 and the lower circuit board 610. A set of microstrip transmission lines 612 may be provided on the upper circuit board 608 within the interstitial regions 606 between adjacent antenna tiles 602a-602d. The microstrip transmission lines 612 may interconnect the plurality of antenna tiles 602a-602d for RF power distribution or for other purposes. The transmission lines 612 may define the distribution network 609. Another distribution network 611 for at least one of electrical power or RF power, RF signals, data or other information may also reside within the interstitial region between the adjacent antenna tiles 602a-602d on the lower circuit board 610.

Each antenna tile 602a-602d may include a center pin 614 of a conductive material extending between the lower circuit board 610 and the upper circuit board 608. An end 616 of each center pin 614 may be exposed by via or opening 618 in the upper circuit board 608. A via cage 620 may extend between the lower circuit board 610 and the upper circuit board 608 about each center pin 614. Each via cage 620 may include a plurality of pins 622 of a conductive material at a predetermined spacing or distance "D" between adjacent pins 622 around a perimeter or boundary about the center pin 614. The pins 622 of each via cage 620 may be a preset distance from the associated center pin 614. The cage 620 may form a circle around the center pin 614 with a spacing "D" between adjacent pin 622 about the circumference around the center pin 614 and each pin 622 may be a preset radius from the associated center pin 614. The via cage 620 may also be other shapes, such as square, rectangular, hexagonal or other shape depending upon the desired operational characteristics. Via cage 620 in the circular configuration shown in the example of FIG. 6 may function as circular waveguide. The spacing "D" may be determined based on an operating frequency of the array 600.

Each antenna tile 602a-602d may also include a feed line 624 or a pair of feed lines 624 extending between the lower circuit board 610 and the upper circuit board 608 within the via cage 620. A radiator probe 626 may be provided on the lower circuit board 610 of each antenna tile 602a-602d and connected to each feed line 624.

Each antenna tile 602a-602d may include multiple sides or four sides and may be configurable for scaling in any planar direction because of the distribution network 609 or networks being within the interstitial region 606 between adjacent antenna tiles 602a-602d. Accordingly, the shared phased array antenna subsystem 600 is scalable by adding or removing adjacent antenna tiles 602a-602d in any planar dimension. The separation between adjacent antenna tiles 602a-602d may be configured so that overall array periodicity from tile-to-tile is not perturbed. This may also be of particular importance in larger arrays such as the exemplary antenna array 700 in FIG. 7. In this respect, secondary grating lobes associated with tile-to-tile separation are not excited and the overall array may be able to provide broad or maximum scanning capability of up to about a 60 degree scan from array broadside or better. In accordance with an embodiment, spacing between a center of adjacent antenna tiles may be about a half-wavelength (λ/2). Half-wavelength spacing provides that all grating lobes from the array 600 will be pushed out of real space and will not adversely affect scanning by the array 600. Accordingly, setting the spacing to half-wavelength at the highest operating frequency ensures minimal if any effect from grating lobes and maximum scanning capability.

The shared phased array antenna subsystem 600 includes a configuration that is scalable by adding or removing antenna tiles to provide at least one of a predetermined range of operation, a predetermined rate of operation, a certain stealth detection probability, anti-jamming capability, and adaptability to concurrent communication network links.

Figure 7:
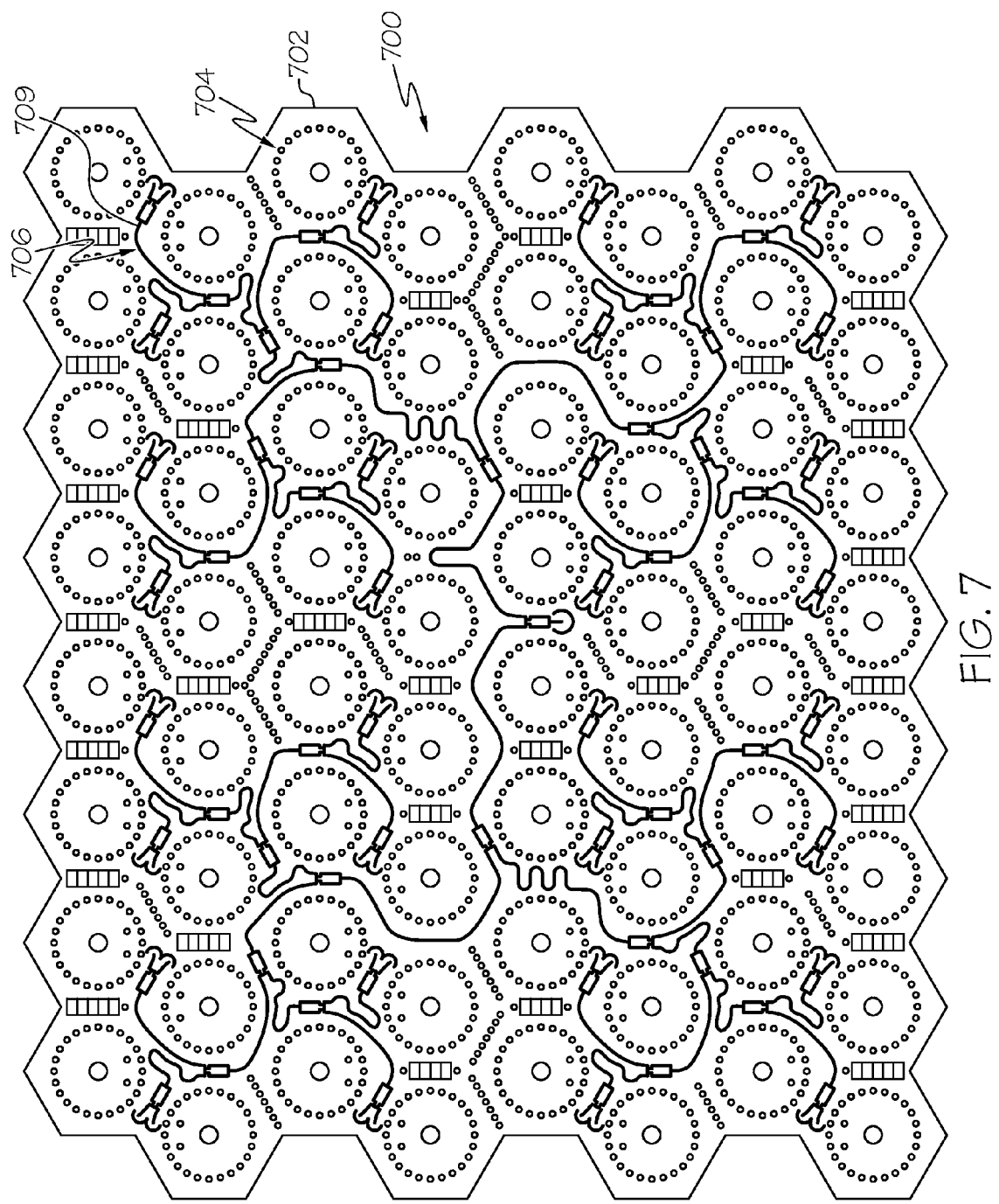
FIG. 7 is a top view of an example of MFSA shared active antenna or radiator array including 64 antenna elements in accordance with an embodiment.

FIG. 7 is a top view of an example of MFSA shared active antenna array 700 or radiator array including 64 antenna tiles 702 in accordance with an embodiment. The antenna tiles 702 may also be referred to as antenna elements or radiator elements. Each of the antenna tiles 702 may be similar to the antenna tiles 602a-602b in FIGS. 6A-6B. The plurality of antenna tiles 702 may be disposed or placed adjacent one another. Each antenna tile 702 may include an active phased array antenna aperture 704 for transmitting and receiving radar signals and communications signals. Interstitial regions 706, similar to interstitial regions 606 in FIGS. 6A and 6B, are provided between adjacent tiles 702. A distribution network 709 for at least one of electrical power or RF power, RF signals, data or other information may reside within the interstitial regions 706 between adjacent antenna tiles 702. In accordance with an embodiment a distribution network for each of electrical or RF power, RF signals, data and other information may be provided within the interstitial regions 706 between adjacent antenna tiles 702.

Figure 8:
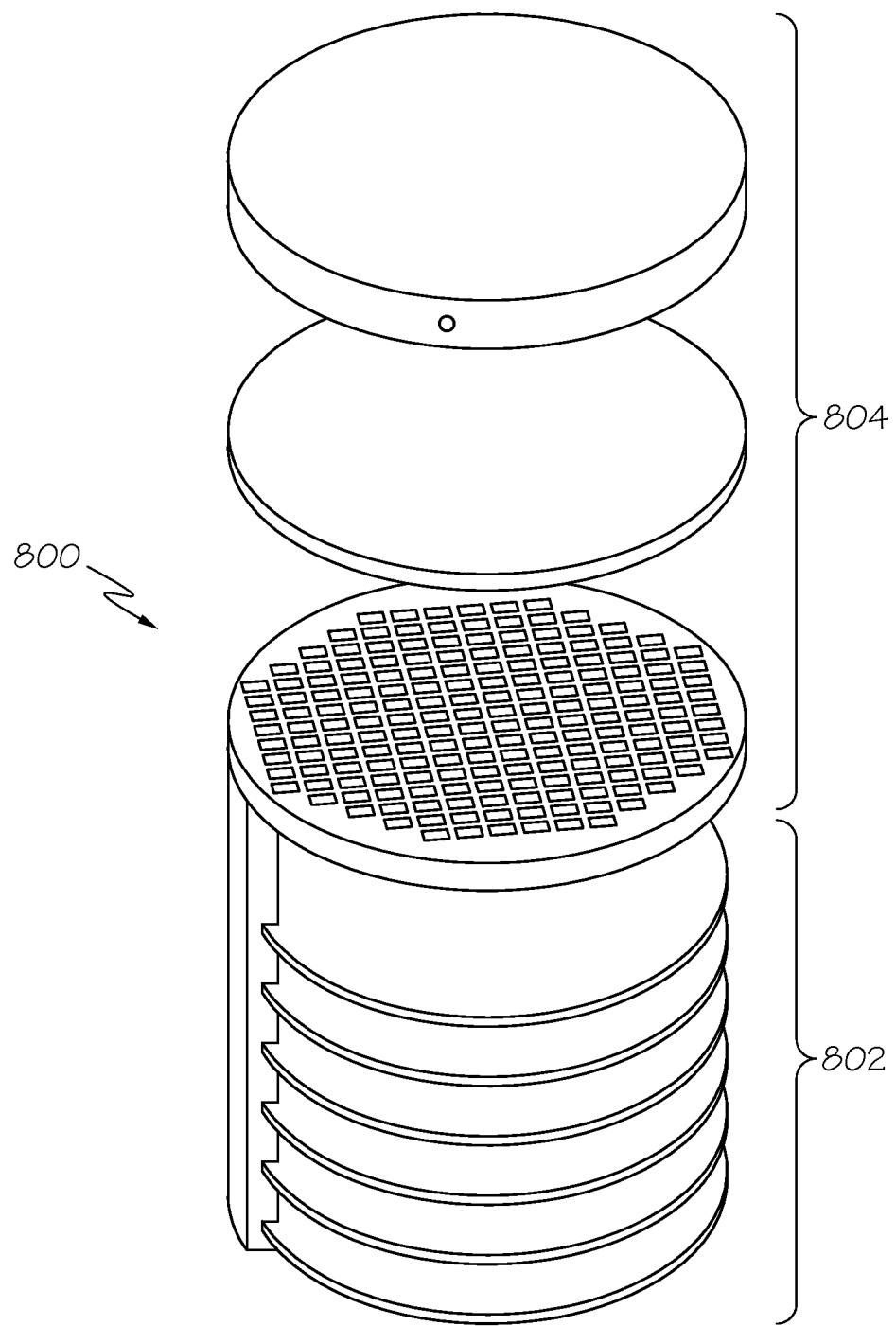
FIG. 8 is an exploded perspective view of an MFSA system in accordance with an embodiment of the present disclosure.

FIG. 8 is an exploded perspective view of an MFSA system 800 in accordance with an embodiment of the present disclosure. The MFSA system 100 in FIG. 1 and exemplary component or subsystems described with reference to FIGS. 2-6A and 6B may be embodied in the MFSA 800. The MFSA system 800 may include a structure comprising a plurality of layers or a multilayered lattice structure. For example, the electronics package 802 may include a multilayered lattice structure adjacent to or behind the shared phased array antenna subsystem 804. As previously described, the shared phased array antenna subsystem 804 may include a plurality of circuit boards stacked on one another. The exemplary electronics package 104 in FIG. 1 may be embodied in the electronic package 802 and may include the mission computer subsystem 114, modulator/demodulator subsystem 106 and RF interface subsystem 108. The shared active phased array antenna subsystem 102 and 600 may be embodied in the shared phased array antenna subsystem 804.

Figure 9:
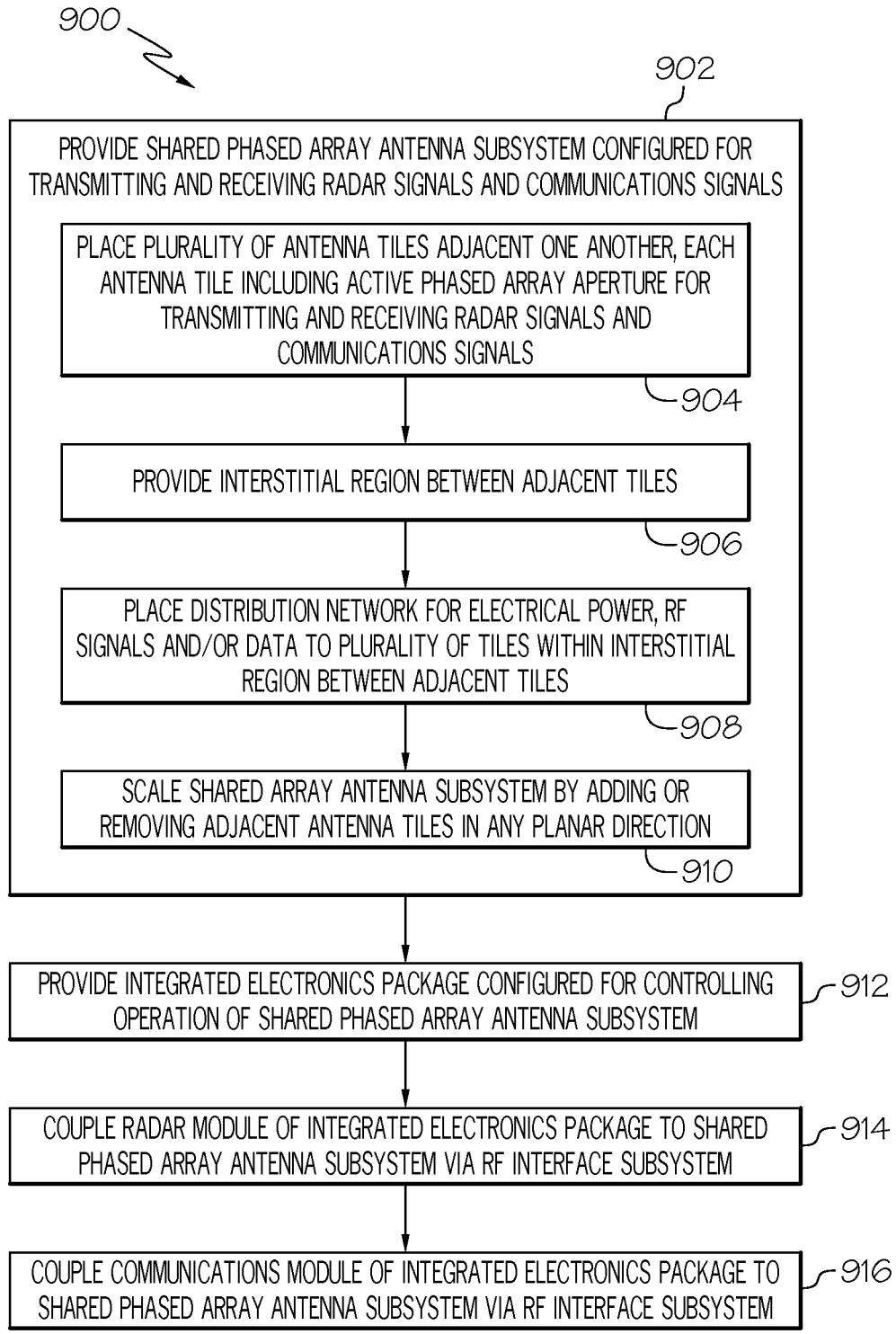
FIG. 9 is a flow chart of an example of a method for providing an MFSA system configured for transmitting and receiving radar signals and communications signals in accordance with an embodiment of the present disclosure.

FIG. 9 is a flow chart of an example of a method 900 for providing an MFSA system configured for transmitting and receiving radar signals and communications signals in accordance with an embodiment of the present disclosure. In block 902, a shared phased array antenna subsystem configured for transmitting and receiving radar signals and communication signals may be provided. Block 902 may include the functions and operations described with respect to blocks 904-910.

In block 904, a plurality of antenna tiles may be placed adjacent one another. Each antenna tile may include an active phased array antenna aperture for transmitting and receiving radar signals and communication signals. In block 906, an interstitial region may be provided between adjacent titles.

In block 908, a distribution network for electrical power or RF power, RF signals and/or data to each of the plurality of antenna tiles may be provided within the interstitial region between adjacent antenna tiles. In accordance with another embodiment a distribution network may be provided for each of electrical power or RF power distribution, RF signals, data distribution or distribution of other information to the plurality of antenna tiles within the interstitial regions between the adjacent antenna tiles.

In block 910, the shared phased array antenna subsystem may be scaled by adding or removing adjacent antenna tiles in any planar direction.

In block 912, and integrated electronics package configured for controlling operation of the shared phased array antenna system may be provided.

In block 914, a radar module of the integrated electronics package may be coupled to the shared phased array antenna subsystem via an RF interface subsystem. In block 916, a communications module of the integrated electronics package may be coupled to the shared phased array antenna subsystem via the RF interface subsystem. The RF interface subsystem may receive control signals for selectively coupling the radar module or the communications module to the shared phased array antenna subsystem for respectively transmitting and receiving radar signals or communications signals. The control signals may be provided by a mission computer subsystem similar to that described herein.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A multi-function radio frequency (RF) system, comprising:
   a mission computer subsystem;
   a shared phased array antenna subsystem configured for transmitting and receiving radar signals and communications signals; and
   an integrated electronics package configured for controlling operation of the shared phased array antenna subsystem, the integrated electronics package comprising a modulator/demodulator subsystem, the modulator/demodulator subsystem comprising:
      a radar module that is selectively coupled to the shared phased array antenna subsystem for transmitting and receiving radar signals, the radar module being configured to transmit and receive radar signals through the shared phased array antenna subsystem,
      a communications module that is selectively coupled to the shared phased array antenna subsystem for transmitting and receiving communications signals, the communications module being configured to transmit and receive communications signals through the shared phased array antenna subsystem, and
      a switch, directly connected to the mission computer subsystem, for communicating data, control signals and information between the modulator/demodulator subsystem and the mission computer subsystem, the switch also being configured to receive at least beam steering control information from the mission computer subsystem.

2. The system of claim 1, wherein the shared phased array antenna subsystem comprises:
   a plurality of antenna tiles disposed adjacent one another, each antenna tile comprising an active phased array aperture for transmitting and receiving radar signals and communications signals;
   an interstitial region between adjacent tiles; and
   a distribution network for at least one of electrical power, RF signals and data to the plurality of tiles, the distribution networks residing within the interstitial region between adjacent tiles.

3. The system of claim 2, wherein the shared phased array antenna subsystem further comprises:
   an upper circuit board;
   a lower circuit board, wherein the lower circuit board is disposed at a distance from the upper circuit board to define an open space between the upper circuit board and the lower circuit board; and a set of microstrip transmission lines provided on the upper circuit board within the interstitial regions between adjacent tiles and interconnecting the plurality of antenna tiles for power distribution, wherein each antenna tile comprises:
a center pin of conductive material extending through the open space between the lower circuit board and the upper circuit board, an end of the center pin being exposed by a via in the upper circuit board;
a via cage extending through the open space between the lower circuit board and the upper circuit board about the center pin;
a feed line extending through the open space between the lower circuit board and the upper circuit board within the via cage; and
a radiator probe provided on the lower circuit board and connected to the feed line.

4. The system of claim 2, wherein each antenna tile comprises multiple sides and is configurable for scaling in any planar direction because of the distribution network for at least one of electrical power, RF communications and data residing within the interstitial region between adjacent tiles.

5. The system of claim 4, wherein the shared phased array antenna subsystem is scalable by adding adjacent antenna tiles in any planar dimension.

6. The system of claim 2, wherein a spacing between a center of adjacent antenna tiles is about half a wavelength which provides a maximum scanning capability.

7. The system of claim 2, wherein the shared phased array antenna subsystem comprises a configuration that is scalable by adding or removing antenna tiles to provide at least one of a predetermined range of operation, a predetermined rate of operation, a certain stealth detection probability, anti jamming capability and an adaptability to concurrent communication network links.

8. The system of claim 1, wherein the electronics package comprise a multilayered lattice structure adjacent to the shared phased array antenna subsystem.

9. The system of claim 1, wherein a radar operating frequency of the system is between about 15.7 GHz and about 17.3 GHz and the communications operating frequency of the system is between about 14.4 GHz and about 15.35 GHz.

10. The system of claim 1, further comprising an RF interface subsystem configured to selectively couple the radar module or the communications module to the shared phased array antenna subsystem.

11. The system of claim 1, wherein the shared phased array antenna subsystem comprises between about 16 antenna elements and about 128 antenna elements.

12. The system of claim 1, wherein the mission computer subsystem comprises a command and control module for controlling operation of the system, an interface module and a data processing module.

13. A shared phased array antenna subsystem, comprising:
a plurality of antenna tiles disposed adjacent one another, each antenna tile comprising an active phased array aperture for transmitting and receiving radar signals and communications signals;
an interstitial region between adjacent tiles; and
a distribution network for at least one of electrical power, radio frequency (RF) signals and data to the plurality of tiles, the distribution network residing within the interstitial region between adjacent tiles;
an upper circuit board; and
a lower circuit board, wherein the plurality of antenna tiles are formed using the upper circuit board and the lower circuit board, and wherein the lower circuit board is disposed at a distance from the upper circuit board to define an open space between the upper circuit board and the lower circuit board.

14. The subsystem of claim 13, further comprising:
a set of microstrip transmission lines provided on the upper circuit board within the interstitial regions between adjacent tiles and interconnecting the plurality of antenna tiles for power distribution, wherein each antenna tile comprises:
a center pin of conductive material extending between the lower circuit board and the upper circuit board, an end of the center pin being exposed by a via in the upper circuit board;
a via cage extending between the lower circuit board and the upper circuit board about the center pin;
a feed line extending between the lower circuit board and the upper circuit board within the via cage; and
a radiator probe provided on the lower circuit board and connected to the feed line.

15. The subsystem of claim 13, wherein each antenna tile comprises multiple sides and is configurable for scaling in any planar direction because of the distribution network for at least one of electrical power, RF communications and data residing within the interstitial region between adjacent tiles.

16. The subsystem of claim 15, wherein the shared phased array antenna subsystem is scalable by adding or removing adjacent antenna tiles in any planar dimension.

17. A method for transmitting and receiving radar signals and communications signals, the method comprising:
providing a shared phased array antenna subsystem configured for transmitting and receiving radar signals and communications signals; and
providing an integrated electronics package configured for controlling operation of the shared phased array antenna subsystem, the integrated electronics package comprising:
a mission computer subsystem;
a radar module that is selectively coupled to the shared phased array antenna subsystem for transmitting and receiving radar signals, the radar module being configured to transmit and receive radar signals through the shared phased array antenna subsystem, and
a communications module that is selectively coupled to the shared phased array antenna subsystem for transmitting and receiving communications signals, the communications module being configured to transmit and receive communications signals through the shared phased array antenna subsystem; and
a switch, directly connected to the mission computer subsystem, for communicating data, control signals and information between the mission computer subsystem and selectively the radar module or the communications module, the switch also being configured to receive at least beam steering control information from the mission computer subsystem.

18. The method of claim 17, further comprising:
placing a plurality of antenna tiles adjacent one another, each antenna tile comprising an active phased array aperture for transmitting and receiving radar signals and communications signals;
providing an interstitial region between adjacent tiles; and
placing a distribution network for at least one of electrical power, radio frequency (RF) communications and data to the plurality of antenna tiles within the interstitial region between adjacent tiles.

19. The method of claim 18, wherein each antenna tile comprises a plurality of sides, the method further comprising scaling the shared phased array antenna subsystem in any planar direction by placing the distribution network for at least one of electrical power, RF communications and data within the interstitial region between adjacent tiles.

20. The method of claim 18, further comprising scaling the shared phased array antenna subsystem by adding adjacent antenna tiles in any planar dimension.

21. The system of claim 3, wherein the via cage comprises a plurality of pins of a conductive material extending through the space between the upper circuit board and the lower circuit board, the plurality of pins being disposed at an equal spacing from one another about the center pin, the spacing being based on an operating frequency of the shared phased array antenna subsystem.

22. The system of claim 1, wherein the modulator/demodulator subsystem further comprises a beam manager that receives the at least beam control information from the switch.

23. The system of claim 1, further comprising an RF interface subsystem, the RF interface subsystem comprising:
a communications RF switch, wherein the communications module comprises a plurality of communications processing channels;
a radar RF switch, wherein the radar module comprises a plurality of radar processing channels, the radar RF switch being configured to select a particular one of the plurality of radar processing channels and/or the communications RF switch being configured to select a particular one of the plurality of communications processing channels in response to a channel switch control signal; and
a radar/communications switch connected to the communications RF switch and the radar RF switch, the radar/communications switch being configured to selectively connect the communications RF switch or the radar RF switch to a particular one of a plurality of antenna tiles of the shared phased array antenna subsystem in response to the channel switch control signal.

\* \* \* \* \*